(12) United States Patent
Bhattiprolu et al.

(10) Patent No.: US 8,069,172 B2
(45) Date of Patent: Nov. 29, 2011

(54) RE-EXECUTING QUERY OBJECTS WITHOUT AFFECTING TRANSACTION DATA IN AN APPLICATION DEVELOPMENT FRAMEWORK NOT PROVIDING FOR CREATION OF MULTIPLE INSTANCES OF THE SAME QUERY OBJECT

(75) Inventors: Pradeep Bhattiprolu, Hyderabad (IN); Rahul Krishan, Jammu (IN)

(73) Assignee: Oracle International Corporation, Redwood Shores, CA (US)

( * ) Notice: Subject to any disclaimer, the term of this patent is extended or adjusted under 35 U.S.C. 154(b) by 445 days.

(21) Appl. No.: 12/264,910

(22) Filed: Nov. 5, 2008

(65) Prior Publication Data

US 2010/0114981 A1    May 6, 2010

(51) Int. Cl.
*G06F 7/00* (2006.01)
*G06F 17/30* (2006.01)
(52) U.S. Cl. ................ 707/736; 707/781; 707/955
(58) Field of Classification Search .......... 707/781, 707/955, 999.001–999.005, 736
See application file for complete search history.

(56) References Cited

U.S. PATENT DOCUMENTS

| | | | | |
|---|---|---|---|---|
| 5,161,225 A * | 11/1992 | Abraham et al. | ....... | 707/999.002 |
| 5,615,362 A * | 3/1997 | Jensen et al. | ........... | 707/999.103 |
| 6,070,165 A * | 5/2000 | Whitmore | .............. | 707/999.101 |
| 7,711,675 B2 * | 5/2010 | Anonsen | ...................... | 707/759 |
| 2003/0023473 A1 * | 1/2003 | Guyan et al. | ...................... | 705/9 |
| 2003/0028545 A1 * | 2/2003 | Wang et al. | ................... | 707/100 |
| 2003/0046639 A1 * | 3/2003 | Fai et al. | ....................... | 715/513 |
| 2006/0206903 A1 * | 9/2006 | Lawrence et al. | ............ | 719/313 |

OTHER PUBLICATIONS

"Oracle Application Development Framework", "http://www.oracle.com/technology/products/adf/index.html", Downloaded Circa: Dec. 22, 2008, p. 1.
"Oracle ADF Learning Center", "http://www.oracle.com/technology/products/adf/learnadf.html", Downloaded Circa: Dec. 22, 2008, p. 1.
"Lynn Munsinger, et al.,", "Oracle Application Development Framework Overview", Dated: Feb. 2006, pp. 1-11.
"Oracle Application Development Framework Developer's Guide for Forms/4GL Developers", Dated: Jun. 2006, pp. 1-1160.

* cited by examiner

*Primary Examiner* — Mohammad Ali
*Assistant Examiner* — Kannan Shanmugasundaram
(74) *Attorney, Agent, or Firm* — Narendra Reddy Thappeta (57) ABSTRACT

Re-executing query objects without affecting transaction data in an application development framework (ADF) not providing for creation of multiple instances of the same query object. In an embodiment, a query associated with a query object is executed to retrieve a transaction data from a data store, which can be further modified based on user interactions. In response to an indication that the query object is to be re-executed for retrieving the transaction data, a new query object is created using the query (along with any required parameters) retrieved from the original query object. The new query object is executed to retrieve a copy of the transaction data from the data store. According to another aspect, a comparison result is generated for the modified transaction data and the copy.

18 Claims, 7 Drawing Sheets

```
331: <?xml version="1.0" encoding="UTF-8" ?>
332: <ViewObject xmlns="http://xmlns.oracle.com/bc4j" Name="ItemMasterEOView"
333: SelectList="ItemMasterEO.ITEM_NUMBER, ItemMasterEO.SHORT_DESCRIPTION,
334:             ItemMasterEO.LONG_DESCRIPTION, ItemMasterEO.PRIMARY_UOM,
335:             ItemMasterEO.SECONDARY_UOM, ItemMasterEO.ITEM_CATEGORY,
336:             ItemMasterEO.TYPE, ItemMasterEO.ALTERNATE_NAME, ItemMasterEO.BUSINESSUNIT_ID,
337:             ItemMasterEO.ORGANIZATION_ID, ItemMasterEO.LOTCONTROLLED_FLAG,
338:             ItemMasterEO.GRADECONTROLLED_FLAG, ItemMasterEO.SUBSTITUTE_FLAG,
339:             ItemMasterEO.STATUSCONTROLLED_FLAG"
340:    FromList="ITEM_MASTER ItemMasterEO" BindingStyle="OracleName" CustomQuery="false"
341:    PageIterMode="Full" UseGlueCode="false" Where="ItemMasterEO.ITEM_NUMBER = :ItemNo">
342:    <Variable Name="ItemNo" Kind="where" Type="oracle.jbo.domain.Number"/>
343:    <EntityUsage Name="ItemMasterEO" Entity="oracle.apps.edr.model.ItemMasterEO" JoinType="INNERJOIN"></EntityUsage>
344:    <ViewAttribute Name="ItemNumber" PrecisionRule="true" EntityAttrName="ItemNumber" EntityUsage="ItemMasterEO" AliasName="ITEM_NUMBER"/>
345:    <ViewAttribute Name="ShortDescription" PrecisionRule="true" EntityAttrName="ShortDescription" EntityUsage="ItemMasterEO"
                       AliasName="SHORT_DESCRIPTION"/>
346:    <ViewAttribute Name="LongDescription" PrecisionRule="true" EntityAttrName="LongDescription" EntityUsage="ItemMasterEO"
                       AliasName="LONG_DESCRIPTION"/>
347:    <ViewAttribute Name="PrimaryUom" PrecisionRule="true" EntityAttrName="PrimaryUom" EntityUsage="ItemMasterEO" AliasName="PRIMARY_UOM"/>
348:    <ViewAttribute Name="SecondaryUom" PrecisionRule="true" EntityAttrName="SecondaryUom" EntityUsage="ItemMasterEO" AliasName="SECONDARY_UOM"/>
349:    <ViewAttribute Name="ItemCategory" PrecisionRule="true" EntityAttrName="ItemCategory" EntityUsage="ItemMasterEO" AliasName="ITEM_CATEGORY"/>
350:    <ViewAttribute Name="Type" PrecisionRule="true" EntityAttrName="Type" EntityUsage="ItemMasterEO" AliasName="TYPE"/>
351:    <ViewAttribute Name="AlternateName" PrecisionRule="true" EntityAttrName="AlternateName" EntityUsage="ItemMasterEO" AliasName="ALTERNATE_NAME"/>
352:    <ViewAttribute Name="Businessunitld" PrecisionRule="true" EntityAttrName="Businessunitld" EntityUsage="ItemMasterEO" AliasName="BUSINESSUNIT_ID"/>
353:    <ViewAttribute Name="Organizationld" PrecisionRule="true" EntityAttrName="Organizationld" EntityUsage="ItemMasterEO" AliasName="ORGANIZATION_ID"/>
354:    <ViewAttribute Name="LotcontrolledFlag" PrecisionRule="true" EntityAttrName="LotcontrolledFlag" EntityUsage="ItemMasterEO"
                       AliasName="LOTCONTROLLED_FLAG"/>
355:    <ViewAttribute Name="GradecontrolledFlag" PrecisionRule="true" EntityAttrName="GradecontrolledFlag" EntityUsage="ItemMasterEO"
                       AliasName="GRADECONTROLLED_FLAG"/>
356:    <ViewAttribute Name="SubstituteFlag" PrecisionRule="true" EntityAttrName="SubstituteFlag" EntityUsage="ItemMasterEO" AliasName="SUBSTITUTE_FLAG"/>
357:    <ViewAttribute Name="StatuscontrolledFlag" PrecisionRule="true" EntityAttrName="StatuscontrolledFlag" EntityUsage="ItemMasterEO"
                       AliasName="STATUSCONTROLLED_FLAG"/>
358: </ViewObject>
```

*FIG. 3A*

```
371A: <ItemMasterEOViewRow>
372A:     <ItemNumber>1223</ItemNumber>
373A:     <ShortDescription>Ax Mini Item</ShortDescription>
374A:     <LongDescription>This is a Test item used to test VO Cloning functionality</LongDescription>
375A:     <PrimaryUom>KGM</PrimaryUom>
376A:     <SecondaryUom>LB</SecondaryUom>
377A:     <Itemcategory>CAT1</Itemcategory>
378A:     <Alternatename>Mini Item</Alternatename>
379A:     <Businessunitid>1231</Businessunitid>
380A:     <Organizationid>1567</Organizationid>
381A:     <LotcontrolledFlag>Y</LotcontrolledFlag>
382A:     <GradecontrolledFlag>Y</GradecontrolledFlag>
383A:     <SubstituteFlag>Y</SubstituteFlag>
384A:     <StatuscontrolledFlag>Y</StatuscontrolledFlag>
385A: </ItemMasterEOViewRow>
```

FIG. 3B

```
371B: <ItemMasterEOViewRow>
372B:     <ItemNumber>1223</ItemNumber>
373B:     <ShortDescription>Ax Mini Item</ShortDescription>
374B:     <LongDescription>This is a Test item used to test VO Cloning functionality</LongDescription>
375B:     <PrimaryUom>KGM</PrimaryUom>
376B:     <SecondaryUom>LB</SecondaryUom>
377B:     <Itemcategory>Category 2</Itemcategory>
378B:     <Alternatename>Mini Item</Alternatename>
379B:     <Businessunitid>1451</Businessunitid>
380B:     <Organizationid>1561</Organizationid>
381B:     <LotcontrolledFlag>Y</LotcontrolledFlag>
382B:     <GradecontrolledFlag>Y</GradecontrolledFlag>
383B:     <SubstituteFlag>Y</SubstituteFlag>
384B:     <StatuscontrolledFlag>Y</StatuscontrolledFlag>
385B: </ItemMasterEOViewRow>
```

RE-EXECUTING QUERY OBJECTS WITHOUT AFFECTING TRANSACTION DATA IN AN APPLICATION DEVELOPMENT FRAMEWORK NOT PROVIDING FOR CREATION OF MULTIPLE INSTANCES OF THE SAME QUERY OBJECT

COPYRIGHT NOTICE

A portion of the disclosure of this patent document contains material which is subject to copyright protection. The copyright owner, Oracle International Corporation, has no objection to the facsimile reproduction by anyone of the patent document or the patent disclosure, as it appears in the Patent and Trademark Office patent file or records, but otherwise reserves all copyright rights whatsoever.

BACKGROUND

1. Technical Field

The present disclosure relates to application development frameworks and more specifically to re-executing query objects without affecting transaction data in an application development framework not providing for creation of multiple instances of the same query object.

2. Related Art

An application refers to a software program, which on execution performs specific desired tasks. In general, several applications are executed in a run-time environment containing one or more of operating systems, virtual machines (e.g., supporting Java™ programming language), device drivers, etc., as is well known in the relevant arts.

Developers often use application development frameworks (ADF) (which are by themselves applications) for implementing/developing desired applications. An ADF provides a set of pre-defined code/data modules that can be directly/indirectly used in the development of an application. An ADF may also provide tools such as an IDE (integrated development environment), code generators, debuggers, etc. which facilitates a developer in coding/implementing the desired logic of the application in a faster/simpler manner.

Query objects refer to code/data modules provided by an ADF which are used to store/retrieve data to/from data stores such as databases. Query objects are often associated with (defined either internally or external to) corresponding structured queries, which on execution cause such storage/retrieval. The stored/retrieved data may then be maintained and/or manipulated in the query object in the form of transaction data. Each query object is typically in the form of a corresponding class in Java programming language type environments.

Thus, transaction data often refers to the data associated with a single transaction/activity performed by a user. Such transaction data are often modified due to user interaction, and the ADF is generally designed to make permanent the changes made to the transaction data. For example, for query objects, the ADF may propagate the changes made to the transaction data to the corresponding data store/database in response to a pre-defined event (e.g., closing of a database connection, receiving a commit indication in response to a user interaction, etc.).

Re-execution of a query object (e.g., to re-execute the associated query) may cause the data retrieved from a data store to overwrite/affect the changed transaction data already maintained in the query object, thereby causing the changes made to the transaction data to be lost. Such overwriting of the transaction data may be avoided by first creating a clone or a new instance of the query object and then executing the cloned/instantiated query object.

In a scenario that the ADF does not provide for creation of multiple instances of the same query object (e.g., by cloning or by instantiating), such a feature of re-executing query objects without affecting transaction data may still be desirable.

BRIEF DESCRIPTION OF THE DRAWINGS

Example embodiments of the present invention will be described with reference to the accompanying drawings briefly described below.

FIG. 3A depicts a portion of XML data representing a query object in one embodiment.

FIG. 3B depicts a portion of transaction data (shown encoded in XML for convenience) generated on execution of a query object in one embodiment.

FIG. 3C depicts a portion of the changed transaction data maintained in a query object in one embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present invention enables re-execution of query objects without affecting transaction data in an application development framework (ADF) not providing for creation of multiple instances of the same query object. In an embodiment, a query associated with a query object is executed to retrieve a transaction data from a data store, which can be further modified based on user interactions.

In response to an indication that the query object is to be re-executed for retrieving the transaction data, a new query object is created using the query (along with any required parameters) retrieved from the original query object. The new query object is executed to retrieve a copy of the transaction data from the data store.

According to another aspect of the present invention, a comparison result is generated for the modified transaction data and the copy. In particular, the value in the modified transaction data (new value) and the copy (old value) for the same attribute are compared and in case of a difference, the old and new values are indicated in a report of the comparison results.

Several aspects of the invention are described below with reference to examples for illustration. However one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore the features/aspects described can be practiced in various combinations, though only some of the combinations are described herein for conciseness.

2. Example Environment

Figure 1:
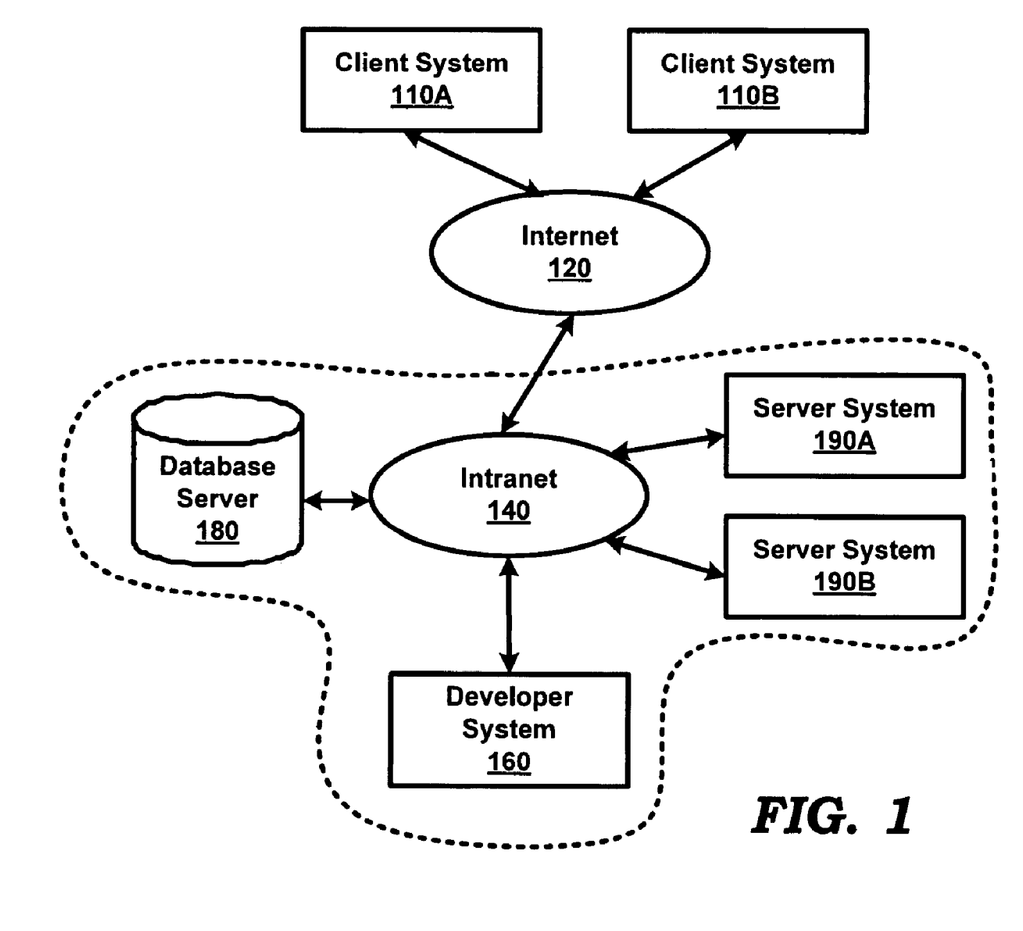
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing client systems 110A-110B, Internet 120, intranet 140, developer system 160, database server 180 and server systems 190A-190B.

Merely for illustration, only representative number/type of systems is shown in the Figure. Many environments often contain many more systems, both in number and type, depending on the purpose for which the environment is designed. Each system/device of FIG. 1 is described below in further detail.

Intranet 140 represents a network providing connectivity between server systems 190A-190B, database server 180 and developer system 160, all provided within an enterprise (shown with dotted boundaries). Internet 120 extends the connectivity of these (and other systems of the enterprise) with external systems such as client systems 110A-110B.

Each of intranet 140 and Internet 120 may be implemented using protocols such as Internet Protocol (IP) well known in the relevant arts. In general, in IP environments, an IP packet is used as a basic unit of transport, with the source address being set to the IP address assigned to the source system from which the packet originates and the destination address set to the IP address of the target system to which the packet is to be eventually delivered.

Database server 180 represents a non-volatile storage facilitating storage and retrieval of a collection of data by one or more (enterprise) applications executing in server systems 190A-190B (typically while processing various client requests). In one embodiment, database server 180 is implemented using relational database technologies and therefore provides storage and retrieval of data using structured queries such as SQL (Structured Query Language). SQL refers to a special-purpose, generally non-procedural language that supports the definition, manipulation, and control of data in systems implementing relational database technologies. However, database server 180 can be implemented using other technologies (e.g., procedural language, hierarchical databases).

Each of client systems 110A-110B represents a system such as a personal computer, workstation, mobile station, etc., used by users to generate (client) requests to enterprise applications executing in server systems 190A-190B. The requests may be generated using appropriate interfaces. In general, a client system requests an application for performing desired tasks and receives corresponding responses containing the results of performance of the requested tasks.

Each of server systems 190A-190B represents a server, such as a web/application server, which executes business/enterprise applications capable of performing task requested by users using one of client systems 110A-110B. A server system may perform the tasks on data maintained internally or on external data (stored in database server 180) and then send the result of performance of the tasks to the requesting client system. Each of server systems 190A-190B may also contain other software programs such as operating system, device drivers, etc., (not shown) that provides a (common) run time environment facilitating the execution of the business/enterprise applications.

As noted above, server systems 190A-190B, database server 180 (together with intranet 140 providing connectivity among the systems) may be implemented in a single "enterprise". In general, the combined systems/servers (excluding the network, which merely provides data transport) shown within the dotted area may be executing an enterprise application, with the various layers (or components) of the enterprise application being executed on the various systems such as server system 190A and database server 180.

Developer system 160 enables developers/users to implement the desired enterprise applications. The implemented enterprise application may then be deployed on one or more of systems in the enterprise (such as server systems 190A-190B and/or database server 180). In one embodiment, the various layers/components of an enterprise application are developed using an application development framework as described below with examples.

3. Developing an Application Using an ADF

Figure 2:
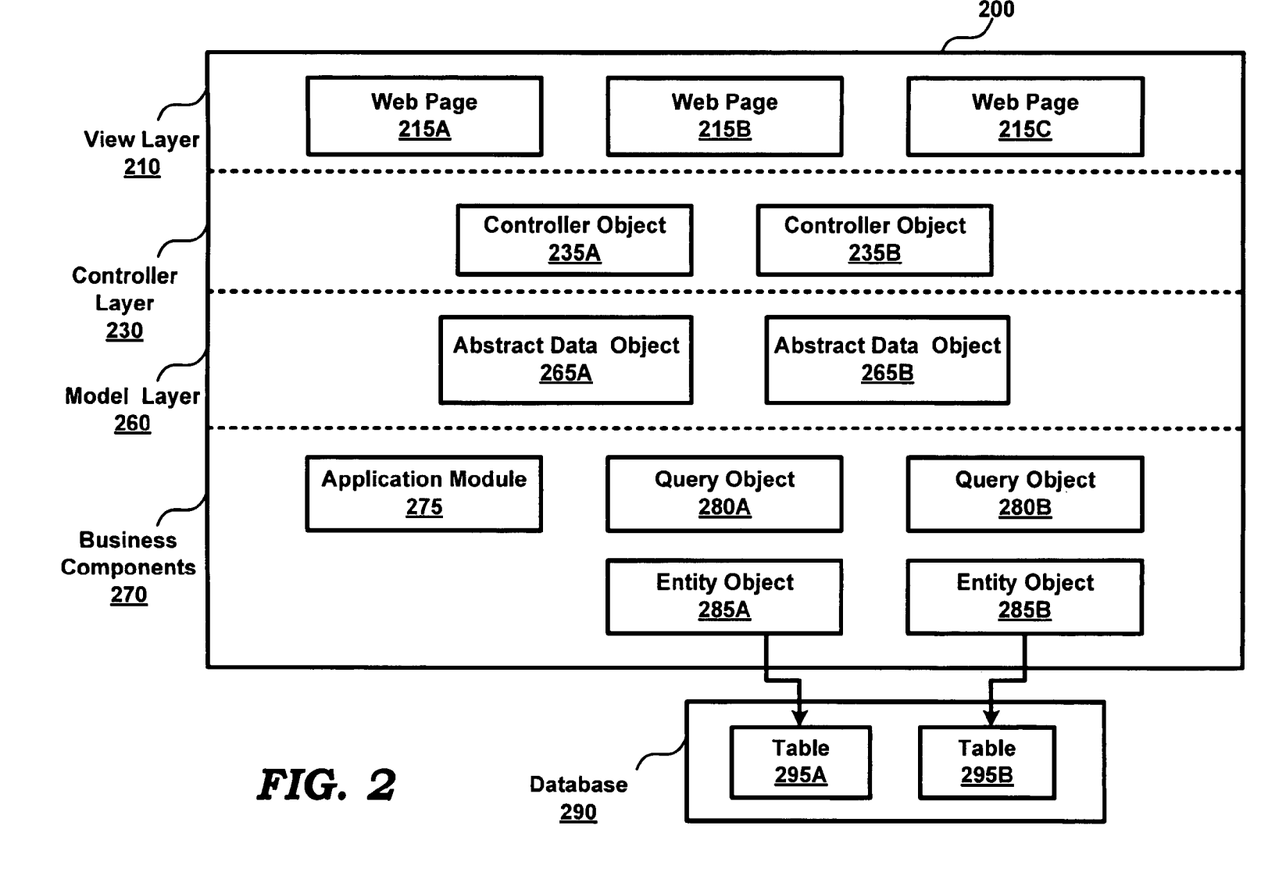
FIG. 2 is a block diagram illustrating the manner in which an enterprise application is developed using an application development framework (ADF) and later executed within the context of ADF in one embodiment.

FIG. 2 is a block diagram illustrating the manner in which an enterprise application is developed using an application development framework (ADF) and later executed within the context of ADF in one embodiment. The modules forming the enterprise application are shown as being within ADF 200 to represent that the modules are developed using ADF and then executed within the context of ADF 200. For conciseness, the various internal details of ADF are not shown within the Figure.

The description is continued assuming that application is developed using Java programming language (available from Sun systems) and Oracle Application Development Framework available as part of JDeveloper 10.1.3, a development tool available from Oracle Corporation. However, the features of the present invention described below may be implemented using any desired combination of programming language and application development framework as will be apparent to one skilled in the relevant arts by reading the disclosure provided herein.

Broadly, ADF 200 enables an application to be developed in the form of multiple layers, each layer containing code modules/files implementing desired logic according to pre-defined specification. Thus, in one embodiment, the ADF enables the application to be developed as four layers—a view layer containing code modules/files that provide the user interface of the application, a controller layer containing code modules that control the flow of the application, a model layer containing data/code modules that provide an abstraction layer for the underlying data, and a business services layer containing code modules that provide access to data from various sources and handles business logic.

It may be appreciated that the development of the application using such a layered approach often simplifies maintenance and reuse of components/code modules across various applications. Further, the independence of each layer from the other layers results in a loosely coupled service oriented architecture (SOA), which may be desirable when deploying the developed business/enterprise application on multiple/different systems (such as server systems 190A-190B).

Referring back to FIG. 2, view layer 210 represents the user interface of the enterprise application being developed. View layer 210 is shown containing web pages 215A-215C, each of which provides a corresponding portion of the user interface and is accessible using a corresponding uniform resource location (URL). The web pages may be sent by the application in response to receiving client requests containing the corresponding URLs. The web pages may then be displayed by a browser on a display unit (not shown) associated with the requesting client system, thereby enabling users using the requesting client system to interact with the enterprise application.

The code files/modules forming the view layer (such as web pages 215A-215C) may be implemented using one or more of hypertext markup language (HTML), Java server pages (JSP), and Java Server Faces (JSF). Alternatively, the user interface may be implemented using Java components such as Swing, and/or extensible markup language (XML).

As noted above, only the relevant user-developed code/data modules are shown in each of the layers. However, each layer typically contains other pre-defined code/ data modules provided by ADF 200. Some of the pre-defined modules may be used during development (in developer system 160), for example, as templates for developing the web pages, for including desired functionality in the developed code etc. Other pre-defined modules (such as a URL rewriting module) may be deployed along with the developed application (executed in server systems 190A-190B) and may provide additional functionalities (mapping of requested URLs to internal names) to the user during execution of the enterprise application.

Controller layer 230 contains code modules/files (such as controller objects 235A-235B) that control the flow of the application. Each of controller objects 235A-235B contains software instructions and/or data implemented according to a desired manner of presenting the web pages in the view layer. The desired manner may include the specific web pages to be displayed when links in another web page are clicked/selected by the user, the page to be displayed when errors occur during execution, indicating the specific data to be stored/retrieved, etc.

The code modules/files forming the controller layer are often implemented as Java servlets receiving the client requests and sending desired web pages as corresponding responses. Controller objects may also be implemented, for example, as Apache Jakarta Struts controllers or according to the JSF standard.

Model layer 260 contains data/code modules (such as abstract data objects 265A-265B) that connect various business services to the objects that use them in the other layers, such as controller objects 235A-235B. Each of abstract data objects 265A-265B provides a corresponding single interface that can be used to access any type of business service, executing in the underlying business service layer. The data objects may abstract the business service implementation details from client and/or expose data control methods/attributes to view components (such as web pages 215A-215C), providing a separation of the view and data layers.

Thus, each business service manages interaction with a corresponding data persistence layer, and also provides such services as object/relational mapping, transaction management, business logic execution, etc. The business services layer may be implemented using one or more of simple Java classes, Enterprise Java Beans, web services, etc.

Business components 270 represents a business service implemented using Oracle Application Development Framework Business Components which provides interaction with databases (for example, database 290 maintained in database server 180). The business components framework enables developers to leverage the power of structured query language (SQL) when building Java objects for accessing databases.

In one embodiment, business components 270 contains a mixture of application modules (such as 275), view/query objects (such as 280A-280B) and entity objects (such as 285A-285B) which cooperate to provide the business service implementation for the underlying database 290.

Application module 275 is a transactional component/code module that UI clients (such as web pages 215A-215C via controller objects 235A-235B) communicate with for working with application/transaction data. Application module 275 provides an updatable data model and also procedures/functions (commonly referred to as service methods) related to user transactions.

Each of entity objects 285A-285B represents a corresponding row in a database table (e.g., one of table 295A-295B) and simplifies the manipulation (update, deletion, etc.) of the data stored in the corresponding row. Entity objects often encapsulate business logic for the corresponding row to ensure that the desired business rules are consistently enforced. Entity objects 285A-285B may also be associated with other entity objects to reflect relationships existing between rows stored in the underlying database 290.

Each of query/view objects 280A-280B represents a code module designed to execute a corresponding SQL query. The query/view objects may simplify working with the results of the query as well. The associated SQL query may be used to perform various operations (such as join, project, filter, sort, and/or aggregate) on the stored data as desired by the developer of the application. Query objects 280A-280B may also be linked to other query objects to represent master/detail data hierarchies. In ADF 200, it may be necessary to store and retrieve data only by using SQL queries associated with query objects.

It may be appreciated that the results of execution of the SQL queries is maintained and/or manipulated in the corresponding query object in the form of transaction data. The transaction data is maintained as (one or more) references to underlying entity objects (such as 285A-285B) created as a result of execution of a query. On modification of the transaction data, the query objects collaborate with the entity objects to consistently validate and save (make permanent) the modifications made to the underlying database 290. The manner in which query objects are implemented and executed in one embodiment is described below with examples.

4. Implementing and Executing Query Objects

FIGS. 3A-3C together illustrates the manner in which query/view objects are implemented and executed in one embodiment. Though the content of FIGS. 3A-3C is shown encoded in extensible markup language (XML) according to one convention, other encoding/formats and conventions may be used for representing the data.

Broadly, a developer implements a query/view object by specifying the details of the associated query using a graphical user interface provided by a development tool (for example, JDeveloper 10.1.3 available from Oracle Corporation). The development tool then stores the specified query (and other information regarding the query object) in the form of XML data as described in detail below.

FIG. 3A depicts a portion of XML data representing a query object (such as 280A or 280B) in one embodiment. Line 331 (tag "<?xml?>") specifies that the data in encoded in XML. Lines 332-358 (between tags "<ViewObject>" and "</ViewObject>") specify the details of a view/query object. In particular, line 332 (attribute "Name") specifies the name "ItemMasterEOView" of the query object.

Lines 333-340 (attribute "SelectList") indicate the specific columns (such as "ItemMasterEO.ITEM_NUMBER") that are to be retrieved from the specific tables "ITEM_MASTER ItemMasterEO" (as indicated by attribute "FromList" in line 340) contained in database 290. Line 341 (attribute "Where") indicates the specific conditions (such as "ItemMasterEO.I-TEM_NUMBER=:ItemNo") that are to be satisfied by the retrieved rows from the table specified in line 340.

Line 342 (tag "Variable") specifies the input variable "ItemNo" whose value is to be substituted in the conditions (as indicated by the value "where" for the "Kind" attribute) before execution of the query. Line 343 (tag "EntityUsage") specifies the name "ItemMasterEO" of entity object to be created (and which may correspond to one of entity objects 285A-285B). Line 343 also specifies the manner "INNER-JOIN" in which the query is to be executed for creating the entity object.

Each of lines 344-357 (tag "ViewAttribute") specifies the manner in which a column retrieved from the database is to be mapped to an attribute contained in the entity object. In particular, line 344 indicates that the column "ITEM_NUMBER" (attribute "AliasName") is to be mapped to the attribute "ItemNumber" (attribute "EntityAttrName") in the entity object "ItemMasterEO" (attribute "EntityUsage"). Similarly, other lines 345-357 specify mappings from the retrieved columns to corresponding attributes in the entity object "ItemMasterEO".

During execution, on receiving an indication that a specific instance (as identified by a unique identifier) of a query object is to be created, the ADF generates the instance of the query object based on the stored XML data and the unique identifier. In one embodiment, the ADF executes the query associated with the query/view object (with the unique identifier used as the value of a corresponding input variable) to retrieve desired data from database 290 and maintains the retrieved data in the form of transaction data.

Thus, for the entity object represented by the XML data depicted in FIG. 3A, the ADF first generates a SQL query from the values of the "SelectList", "FromList" and "Where" attributes and the value of the unique identifier item number (assumed to be "1223" for convenience) as shown below:

```
SELECT
  ItemMasterEO.ITEM_NUMBER,
  ItemMasterEO.SHORT_DESCRIPTION,
  ItemMasterEO.LONG_DESCRIPTION,
  ItemMasterEO.PRIMARY_UOM,
  ItemMasterEO.SECONDARY_UOM,
  ItemMasterEO.ITEM_CATEGORY,
  ItemMasterEO.TYPE, ItemMasterEO.ALTERNATE_NAME,
  ItemMasterEO.BUSINESSUNIT_ID,
  ItemMasterEO.ORGANIZATION_ID,
  ItemMasterEO.LOTCONTROLLED_FLAG,
  ItemMasterEO.GRADECONTROLLED_FLAG,
  ItemMasterEO.SUBSTITUTE_FLAG,
  ItemMasterEO.STATUSCONTROLLED_FLAG
FROM
  ITEM_MASTER ItemMasterEO
WHERE
  ItemMasterEO.ITEM_NUMBER = 1223
```

It may be observed that value "1223" of the item number is substituted in place of the variable "ItemNo" in the condition as specified in line 342. The above query is then executed by the ADF to retrieve the specified columns for the specific row that has item number equal to "1223" in the table "ItemMasterEO". The retrieved columns are then mapped to corresponding attributes in a newly created entity object "ItemMasterEO" as specified by the XML data of FIG. 3A.

ADF 200 then generates the query object and the corresponding entity objects by extending pre-defined templates/interfaces/code modules according to the data retrieved from the database. In one embodiment, the ADF is designed to include in the query object, the query generated (shown above), the input variable names/values and the newly created entity object (along with its attributes) as transaction data.

Thus, the ADF creates the specific instance (as identified the item number "1223") of the query/view object (280A) in response to receiving the indication noted above. It may be noted that the query object contains transaction data that is tightly coupled to the data maintained in the database. It may accordingly be appreciated that various data consistency issues may be presented if multiple instances of the same query object are to be created.

Accordingly, in one embodiment, the ADF allows only one single/specific instance of a query object to be created. The ADF does not provide for the creation of multiple instances (either through cloning or instantiating) of the same query object. The description is continued illustrating the manner in which transaction data is generated and maintained when only a single/specific instance of a query/view object is allowed to be created in one embodiment.

FIG. 3B depicts a portion of transaction data (shown encoded in XML for convenience) generated on execution of a query object in one embodiment. It may be observed that lines 371A-385A is shown as being contained in the tag "ItemMasterEOViewRow" (the name of the view/query object as specified in line 332), and that the tags in each of lines 372A-384A specifies an attribute (and a corresponding value) generated corresponding to a retrieved column as specified by lines 344-357 of FIG. 3A.

Thus, line 372A specifies an attribute "ItemNumber" having a corresponding value "1223". Lines 373A-384A specifies other attributes (and corresponding values) maintained as part of the transaction data.

The transaction data thus generated may be stored within the query object, as well as stored on a secondary storage (for example, to release the memory allocated to a query object if the object is not used, or for any recovery purpose).

It may be appreciated that during further user interactions, the values of the attributes may be modified, for example, in response to a user specifying the desired data using an appropriate user interface. Such modifications to the transaction data may be maintained in the specific instance of the view/query object as described in detail below.

FIG. 3C depicts a portion of the changed transaction data maintained in a query object in one embodiment. Lines 371B-385B are similar to corresponding lines 371A-385A and as such depicts the various attributes (and corresponding values) maintained in transaction data. It may be observed that the values of the attributes "Itemcategory" (line 377A/B), "Businessunitid" (line 379A/B) and "Organizationid" (line 380A/B) are different, indicating that the transaction data has been modified after generation of the query/view object.

Thus, the transaction data is generated and maintained in the specific instance of a query/view object. It may be desirable that the original transaction data (generated on execution of the query object) be made available along with the modified transaction data. Such a requirement may necessitate the re-execution of the query object, especially in the scenario where the ADF is designed not to provide for multiple instances of the same query object.

Re-execution of the specific instance of a query object may revert the transaction data to the values originally generated (FIG. 3B) thereby causing the changes made to the transaction data (FIG. 3C) to be lost. Such a loss of data may be undesirable, at least in a scenario when the changes made to the transaction data need to be maintained for saving/persisting to the database in response to future user interactions (such as, when the user selects/clicks a "Save" button).

It should be appreciated that the re-execution of the same query object could be avoided if multiple instances of the same query object were allowed to be created. For example, in the scenario of Java Programming Language, multiple instances of the same query object can be created using either of the below type of operations:

ItemMaster*EO*View item=new ItemMaster*EO*View( ); Operation (1)

ItemMaster*EO*View item=ItemMaster*EO*View.clone
 ( ); Operation (2)

where Operation 1 creates an instance of the specific query object of interest, and operation 2 would be designed to create a clone of the specific query object.

Thus, if the above type of operations were permitted, these operations would be present in the code modules forming the enterprise application. Since either of these operations are not permitted by ADF 200, various aspects of the present invention facilitate the related need to be fulfilled.

As will be clear from the description below, several aspects of the present invention facilitate query objects to be re-executed without affecting transaction data in ADF 200. In one embodiment, such features are operative by execution of software instructions constituting a copy tool (executing in one of server systems 190A-190B), and accordingly the description below is provided with respect to the copy tool.

5. Re-Executing Query Objects

Figure 4:
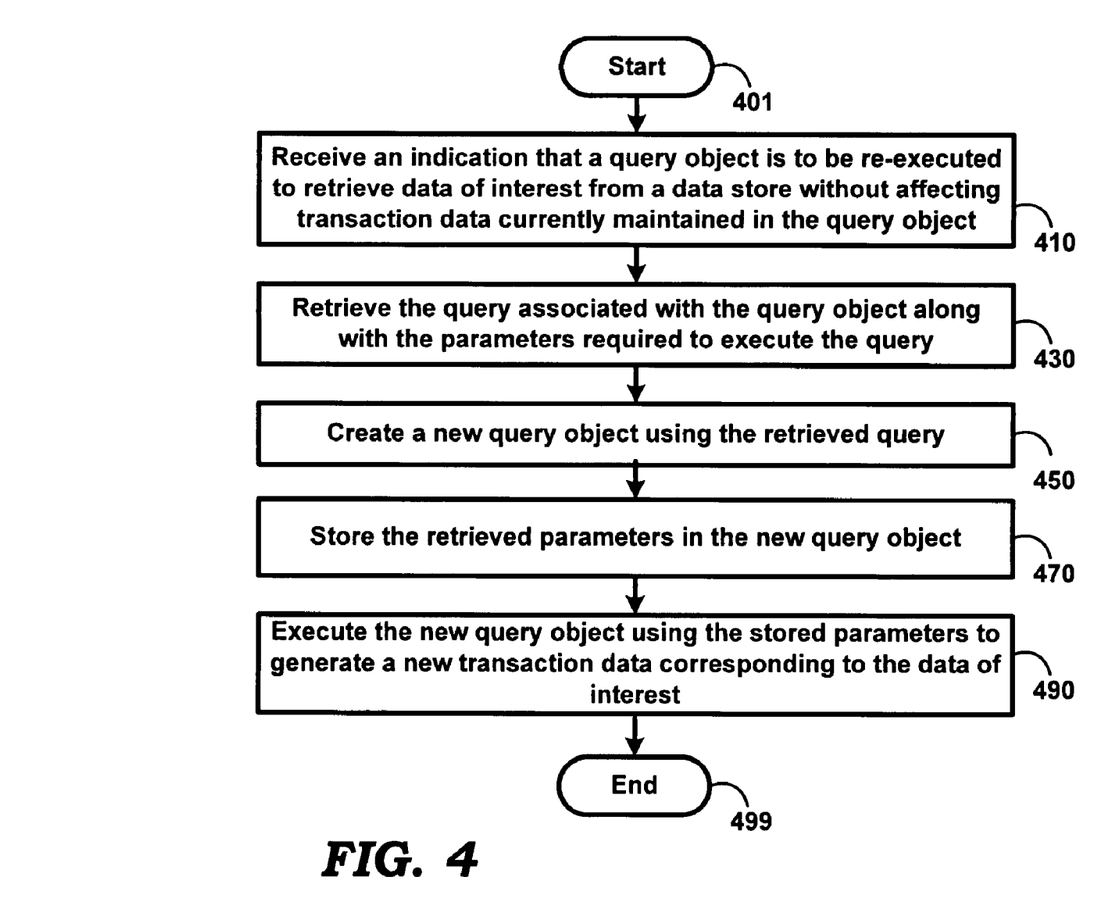
FIG. 4 is a flowchart illustrating the manner in which query objects are re-executed without affecting transaction data in an application development framework (ADF) preventing creation of multiple instances of the same query object according to an aspect of the present invention.

FIG. 4 is a flowchart illustrating the manner in which query objects are re-executed without affecting transaction data in an application development framework (ADF) preventing creation of multiple instances of the same query object according to an aspect of the present invention.

The flowchart is described with respect to FIGS. 1, 2, 3A, 3B and 3C merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 401, in which control immediately passes to step 410.

In step 410, the copy tool receives an indication that a query object is to be re-executed to retrieve data of interest from a data store (database 290) without affecting transaction data currently maintained in the query object. For example, the indication may specify that query object 280A is to be re-executed to retrieve data of interest (FIG. 3B) without affecting the transaction data (FIG. 3B or 3C, assumed to be of 3C hereafter). The indication may be received from a code module executing in server systems 190A/190B within the context of ADF 200.

In step 430, the copy tool retrieves the query associated with the query object along with the parameters required to execute the query. The parameters correspond to the input variables name-value pairs that are maintained in the query object. Thus, for query object 280A depicted in FIG. 3A, the copy tool may retrieve the query generated (shown above) along with the parameter named "ItemNo" and its corresponding value "1223".

In step 450, the copy tool creates a new query object using the retrieved query. In one embodiment, the new query object is created by invoking appropriate methods provided by application module 275, thereby ensuring the new query object is a copy of the original query object desired to be re-executed. Alternatively, the copy tool may be implemented to create the new query object by extending pre-defined code modules provided by the ADF.

In step 470, the copy tool stores the retrieved parameters in the new query object, thereby making the query object ready for execution. Thus, in the above example, the copy tool (creates and) stores the parameter "ItemNo" and its value "1223" in the new query object. It may be appreciated that the new query object is similar to the original query object in all aspects except the transaction data—the new query object maintaining no transaction data, while the original query object maintains the changed transaction data of FIG. 3C.

In step 490, the copy tool executes the new query object using the stored parameters to generate a new transaction data corresponding to the data of interest. The changed transaction data currently maintained (as shown in FIG. 3C) in the original query object is not affected by the execution of the new query object, thereby enabling the retrieved data of interest (FIG. 3B) to be available in the new query object. However, the changed transaction data is also available at the same time in the enterprise application/ADF. The flow chart ends in step 499.

Thus, the copy tool enables query objects to be re-executed without affecting the transaction data in an ADF preventing creation of multiple instances of the same query object. The manner in which the copy tool is implemented and used in one embodiment is described below with examples.

6. Example Implementation

Figure 5:
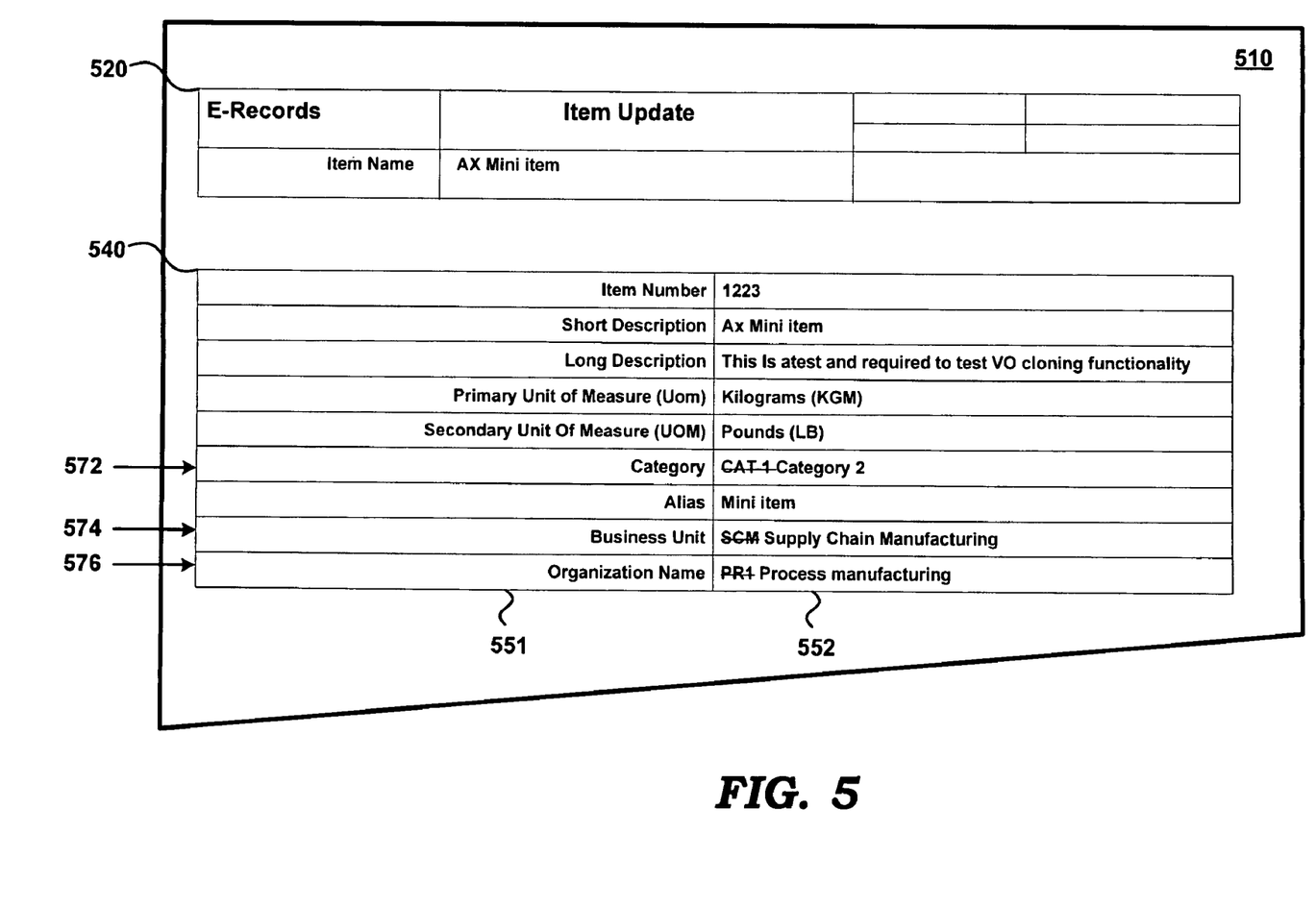
FIG. 5 depicts a portion of a change report sought to be generated when modifications are made to item details in one embodiment.

In one embodiment, the copy tool is implemented for generating a change report indicating the specific modifications/changes made to data of interest (for example, item details). Accordingly, the description is continued illustrating the change report sought to be generated followed by the manner of implementation.

FIG. 5 depicts a portion of a change report sought to be generated when modifications are made to item details in one embodiment. Display area 510 indicates the specific change type "Item Update" and item name "AX Mini item" for which the change report is being generated. It may be noted that the item name is similar to the item name in the specific instance (having item number "1223") of the query object generated above.

Table 540 specifies the attributes of the item for which the change report is generated. In particular, column 551 specifies the name for each of the attributes while column 552 specifies the corresponding values for each of the attributes. It may be observed that in each of rows 572, 574 and 576, the old value is shown as being struck out, while the new/current value is shown adjacent to the old value to indicate that the values corresponding to these attributes have been modified.

It may be appreciated that the generation of the change report of FIG. 5 would necessitate that the original transaction data and the changed transaction data be made available at the same time by the re-execution of the specific instance (item number "1223") of the query object. The description is continued illustrating that manner in which the re-execution of the query object instance is performed using the copy tool provided according to several aspects of the present invention.

In one embodiment, the copy tool is implemented as a class (named "ChangeReportHelper") using Java programming language, well known in the relevant arts. As is well known, a class may contain various methods and variables (either visible only locally or to external classes). As such, the various steps performed by the copy tool are shown below as being performed by different methods. However, in other embodiments, the steps may be implemented in the form of any desired number of methods (for example, as a single method).

Further, the names of the methods and variables are chosen to closely describe the function (utility) provided by the corresponding methods/variables. While only a skeleton of the program logic is provided for conciseness, it should be appreciated that the implementation of the entire program logic(s) will be apparent to one skilled in the relevant arts by reading the disclosure provided herein.

In one embodiment, the copy tool class "ChangeReportHelper" is invoked from the software instructions constituting application module 275 as follows:

```
ChangeReportHelper helper = new ChangeReportHelper( );
helper.createReport(this, ItemMasterEOView)
```

It may be observed that the "createReport" method is being invoked with the instance of the application module in which the code is being executed (as indicated by the keyword "this") and the query/view object "ItemMasterEOView" generated by the ADF above (and which is sought to be re-executed, hereafter referred to as the target query object).

The "createReport" method then invokes (with the same arguments) an internal/private method named "extractVOValues" designed to retrieve the query (along with the parameters) associated with the target query object. The method may be implemented as follows:

```
private void extractVOValues(ApplicationModule am, ViewObject vo){
String queryString = vo.getQuery( );
String queryParams[ ] =
vo.getNamedWhereClauseParams( ).getAttributeNames( );
Object queryParamVal[ ] =
vo.getNamedWhereClauseParams( ).getAttributeValues( );
XMLNode transactionXML =
(XMLNode)vo.getCurrentRow( ).writeXML(-1,
ViewObject.XML_OPT_ALL_ROWS);
createMirrorVO(queryString, queryParams, queryParamVal,
transactionXML, am);
}
```

It may be noted that the target query object is being passed as the argument "vo" and that value of the query associated with the target query object is retrieved using the method "getQuery" (step 430) and stored in the variable "queryString". Similarly, the parameter names and corresponding values are retrieved and stored respectively in the array variables "queryParams" and "queryParamVal" (step 430).

A reference to the current transaction data is then retrieved (in the form of a XML node forming the root of the XML data) from the entity object associated with the target query object and stored in the variable "transactionXML". It may be appreciated that the variable "transactionXML" may be a pointer to the root element "ItemMasterEOViewRow" of the transaction data depicted in FIG. 3C.

After the values required for creating a copy of the target query object are determined, another internal/private method "createMirrorVO" is invoked with the retrieved values and the application modules (received as an argument). It may be noted, that a reference to the target query object is not passed to the "createMirrorVO" method, thereby freeing the target query object for further processing (for example, for further user interaction).

In the "createMirrorVO" method, first a copy of the target query object is generated and used to retrieve the original transaction data and then the change report is generated based on the differences in the current transaction data (received as an argument) and the determined original transaction data. The portions of the "createMirrorVO" method which generates the copy may be implemented as follows:

```
private void createMirrorVO(String query, String[ ] queryParams,
Object[ ] paramValues, XMLNode transactionXML,
ApplicationModule am){
AttributeListImpl attrList = new AttributeListImpl(queryParams,
paramValues);
ViewObject srcVO = am.createViewObjectFromQueryStmt("CloneVO",
query);
for (int i = 0; i < queryParams.length; i++){
srcVO.defineNamedWhereClauseParam(queryParams[i], null,
new int[ ]{ i });
}
srcVO.setNamedWhereClauseParams(attrList);
srcVO.executeQuery( );
```

It may be observed that the a new query object named "CloneVO" is first created using the application module and the query associated with the target query object (step 450).

The application module creates the new query/view object and makes it available for access in the ADF. The retrieved parameter names are then stored in the new query object using the "for" loop and the parameter values are stored using the "setNamedWhereClauseParams" method (step 470). Thus, the new query object "CloneVO" is made similar to (or a copy of) the target query object.

The new query object "CloneVO" is then executed to cause the original transaction data to be retrieved and stored in the new query object (step 490). A reference to the original/source transaction data is then retrieved as follows:

```
XMLNode sourceXML = null;
if (srcVO.getRowCount( ) == 1){
sourceXML = (XMLNode)srcVO.first( ).writeXML(-1,
ViewObject.XML_OPT_ALL_ROWS);
} else{
throw new JboException("Invalid Parameters");
}
srcVO.remove( );
```

The variable "sourceXML" stores a reference to the XML node forming the root of the original transaction data (in the form of XML). It may be appreciated that the variable "sourceXML" may be a pointer to the root element "ItemMasterEOViewRow" of the transaction data depicted in FIG. 3B. It may be observed that the new query object is removed from the application module by invoking the "remove" method, thereby making the new query object not available for any further processing.

The original transaction data and the current transaction data are retrived (using the references respectively stored in "sourceXML" and "transactionXML") and then compared to generate the differences as follows:

```
DocumentBuilderFactory dbf = DocumentBuilderFactory.newInstance( );
DocumentBuilder db = dbf.newDocumentBuilder( );
StringWriter writer = new StringWriter( );
sourceXML.print(writer);
ByteArrayInputStream src = new
ByteArrayInputStream(writer.toString( ).getBytes( ));
XMLDocument srcDoc = (XMLDocument)db.parse(src);
StringWriter transWriter = new StringWriter( );
transactionXML.print(transWriter);
ByteArrayInputStream txn = new
ByteArrayInputStream(transWriter.toString( ).getBytes( ));
XMLDocument txnDoc = (XMLDocument)db.parse(txn);
XMLDocument xsl = getDiff(srcDoc, txnDoc);
```

Broadly, the root reference stored in "sourceXML" is used to first retrieve all the nodes under the XML node in the XML hierarchy. The nodes are then converted to a string and then to a stream of bytes, which is then parsed to generate an XML document in memory (stored in the variable "srcDoc") corresponding to the portion of the original XML data depicted in FIG. 3B. Similarly, another XML document (stored in the variable "txnDoc") is generated in memory corresponding to the portion of the current XML data depicted in FIG. 3C.

The difference (variable "xsl") between the XML documents is then determined using another private/internal method named "getDiff". The difference between the documents and the current transcation data may be then be used to generate the change report as follows:

```
BIPublisher biPublisher=new BIPublisher( );
biPublisher.generateDocument(txnDoc, xsl, 'PDF');
}
```

Here, the class "BIPublisher" is designed to generate the change report of FIG. 5 based on the current transaction data and the difference between the XML data. Accordinlgy, a method "generateDocument" of the class "BIPublisher" is invoked with the XML document containing the current transcation data (variable "txnDoc"), the difference (variable "xsl") and the type "PDF" of the document to be generated. The curly bracket "}" indicates the end of the "createMirrorVO" method.

It may be appreciated that the difference between the original and the current transaction data may be determinde using the internal method "getDiff" which may be implemented as follows:

```
private XMLDocument getDiff(XMLDocument src_xml,
    XMLDocument trans_xml){
    XMLDiff diff = new XMLDiff( );
    diff.setInput1(src_xml);
    diff.setInput2(trans_xml);
    boolean isDiff = diff.diff( );
    XMLDocument xslDoc = null;
    if (isDiff)
        xslDoc = diff.generateXSLDoc( );
    return xslDoc;
}
```

Thus, the change report indicating the changes/modifications made to the transaction data maintained in a query object is generated. Similarly, change reports for other query objects of interest may be generated.

It may be appreciated that though the applicable software code is shown above in terms of pseudo-code similar to Java programming language, several embodiments of present invention can be implemented using other languages and for other formats, without departing from the scope and spirit of the present invention, as will be apparent to one skilled in the relevant arts by reading the disclosure provided herein.

It should be further appreciated that the above-described features of code tool may be implemented in a combination of one or more of hardware, software and firmware (though embodiments are described as being implemented in the form of software instructions). The description is continued with respect to an embodiment in which various features are operative by execution of corresponding software instructions.

7. Digital Processing System

Figure 6:
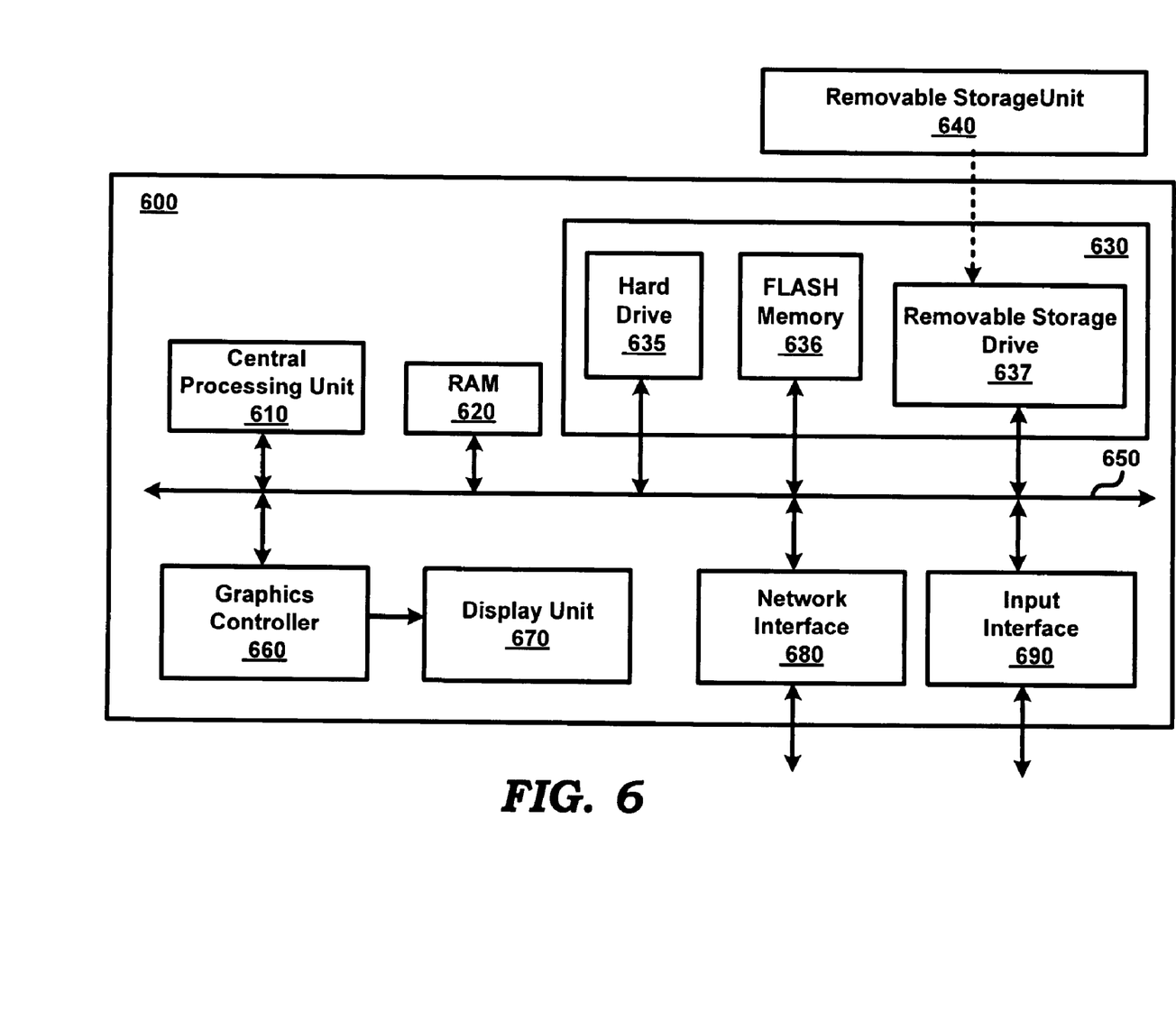
FIG. 6 is a block diagram illustrating the details of a digital processing system in which various aspects of the present invention are operative by execution of appropriate software instructions.

FIG. 6 is a block diagram illustrating the details of digital processing system 600 in which various aspects of the present invention are operative by execution of appropriate software instructions. Digital processing system 600 may correspond to any system (such as server systems 190A-190B) implementing the copy tool and/or application development framework.

Digital processing system 600 may contain one or more processors such as a central processing unit (CPU) 610, random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present invention. CPU 610 may contain multiple processing units, with each processing unit potentially being designed for a specific task. Alternatively, CPU 610 may contain only a single general-purpose processing unit. RAM 620 may receive instructions from secondary memory 630 using communication path 650.

Graphics controller 660 generates display signals (e.g., in RGB format) to display unit 670 based on data/instructions received from CPU 610. Display unit 670 contains a display screen to display the images (e.g., portions of screen depicted in FIG. 5) defined by the display signals. Input interface 690 may correspond to a keyboard and a pointing device (e.g., touch-pad, mouse) and may be used to provide inputs.

Network interface 680 provides connectivity to a network (e.g., using Internet Protocol), and may be used to communicate with other connected systems (such as client systems 110A-110B, database server 180) of FIG. 1.

Secondary memory 630 may contain hard drive 635, flash memory 636, and removable storage drive 637. Secondary memory 630 may store the data (e.g., portions of data depicted in FIGS. 3A, 3B and 3C) and software instructions (e.g., portions of code described above and/or code/data modules depicted in FIG. 2), which enable digital processing system 600 to provide several features in accordance with the present invention.

Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

A module/block may be implemented as a hardware circuit containing custom very large scale integration circuits or gate arrays, off-the-shelf semiconductors such as logic chips, transistors or other discrete components. A module/block may also be implemented in programmable hardware devices such as field programmable gate arrays, programmable array logic, programmable logic devices, or the like.

Modules/blocks may also be implemented in software for execution by various types of processors. An identified module of executable code may, for instance, contain one or more physical or logical blocks of computer instructions which may, for instance, be organized as an object, procedure, or function. Nevertheless, the executables of an identified module need not be physically located together, but may contain disparate instructions stored in different locations which when joined logically together constitute the module/block and achieve the stated purpose for the module/block.

It may be appreciated that a moduleiblock of executable code could be a single instruction, or many instructions and may even be distributed over several code segments, among different programs, and across several memory devices. Further, the functionality described with reference to a single module/block can be split across multiple modules/blocks or alternatively the functionality described with respect to multiple modules/blocks can be combined into a single (or other combination of blocks) as will be apparent to a skilled practitioner based on the disclosure provided herein.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

8. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way

What is claimed is:

1. A non-transitory computer readable medium storing executable code which can be executed by one or more processors of a system, said executable code comprising:
   a first set of instructions providing an application development framework (ADF) for executing query objects, wherein each query object specifies a corresponding query and also a corresponding entity object (EO) to be used for storing the results of processing of the corresponding query,
   wherein an instance of the query object is required for execution of said corresponding query specified in the query object, wherein said ADF does not provide for multiple instances of the same query object;
   a second set of instructions forming at least a portion of an application executing in the context of said ADF, said application comprising a plurality of query objects including a first query object, wherein said first query object specifies a first query and a first EO,
   some of said second set of instructions upon processing by said one or more processors cause creation of a first query instance of said first query object, execution of said first query in said first query instance to retrieve a first transaction data from a data store as a first EO instance of said first EO, and to modify said first transaction data to form a modified transaction data in said first EO instance,
   wherein said ADF does not provide for another instance of said first query object and re-execution of said first query in said first query instance is designed to cause retrieval of said first transaction data again into said first EO instance to thereby overwrite said modified transaction data; and
   a third set of instructions upon execution by said one or more processors causes said system to perform the actions of:
      retrieve said first query associated with said first query instance along with a first set of parameters required to execute said first query;
      create a new instance of a new query object using said retrieved first query, wherein said new query object has a different name compared to the name of said first query object and also specifies said first EO;
      store said retrieved first set of parameters in said new instance of said new query object; and
      execute said first query in said new instance in the context of said ADF to retrieve another copy of said first transaction data from said data store as a second EO instance of said first EO,
      whereby said another copy of said first transaction data is retrieved without creating said another instance of said first query object and also without overwriting said modified transaction data in said first EO instance.

2. The non-transitory computer readable medium of claim 1, wherein said first set of parameters are maintained in said first query instance and wherein said retrieve retrieves said first set of parameters from said first query instance.

3. The non-transitory computer readable medium of claim 2, wherein said data store comprises a relational database, wherein each row of a first table in said relational database is retrieved into a corresponding instance of the first EO upon execution of said first query specified in said first query object,
wherein said first transaction data retrieved into said first EO instance and said second EO instance comprises data stored in a first row of said first table in said relational database.

4. The non-transitory computer readable medium of claim 3, wherein said first query is according to structured query language (SQL).

5. The non-transitory computer readable medium of claim 1, wherein said application comprises a code module which generates an indication that said another copy is to be retrieved from said data store and said actions are performed in response to said indication.

6. The non-transitory computer readable medium of claim 5, wherein each of said modified transaction data in said first EO instance and said another copy in said second EO instance comprise a same set of attributes, wherein each attribute has an associated value, said code module is designed to perform the further actions of:
retrieve a first set of values corresponding to said same set of attributes in said modified transaction data and a second set of values corresponding to said same set of attributes in said another copy of said first transaction data;
compare said first set of values with the respective ones of said second set of values; and
generate a result of comparison for each of said same set of attributes.

7. The non-transitory computer readable medium of claim 6, wherein said result corresponding to a first attribute indicates an old value and a modified value,
wherein said old value is contained in said first set of values and said modified value is contained in said second set of values associated with said first attribute,
wherein said first attribute is contained in said same set of attributes.

8. The non-transitory computer readable medium of claim 1, wherein said application is developed using said ADF.

9. The non-transitory computer readable medium of claim 8, wherein said application comprises a view layer, a controller layer, a model layer and a business service layer.

10. A digital processing system comprising:
a processor;
a random access memory (RAM); and
a machine readable medium storing a first set of instructions, a second set of instructions and a third set of instructions,
wherein said first set of instructions when retrieved into said RAM and executed by said processor provides an application development framework (ADF) for executing query objects, wherein each query object specifies a corresponding query and also a corresponding entity object (EO) to be used for storing the results of processing of the corresponding query,
wherein an instance of the query object is required for execution of said corresponding query specified in the query object, wherein said ADF does not provide for multiple instances of the same query object;
wherein said second set of instructions when retrieved into said RAM and executed by said processor forms at least a portion of an application executing in the context of said ADF, said application comprising a plurality of query objects including a first query object, wherein said first query object specifies a first query and a first EO,
some of said second set of instructions upon processing by said processor cause creation of a first query instance of said first query object, execution of said first query in said first query instance to retrieve a first transaction data from a data store as a first EO instance of said first EO, and to modify said first transaction data to form a modified transaction data in said first EO instance,
wherein said ADF does not provide for another instance of said first query object and re-execution of said first query in said first query instance is designed to cause retrieval of said first transaction data again into said first EO instance to thereby overwrite said modified transaction data; and
wherein said third set of instructions when retrieved into said RAM and executed by said processor causes said digital processing system to perform the actions of:
retrieve said first query associated with said first query instance along with a first set of parameters required to execute said first query;
create a new instance of a new query object using said retrieved first query, wherein said new query object has a different name compared to the name of said first query object and also specifies said first EO;
store said retrieved first set of parameters in said new instance of said new query object; and
execute said first query in said new instance in the context of said ADF to retrieve another copy of said first transaction data from said data store as a second EO instance of said first EO,
whereby said another copy of said first transaction data is retrieved without creating said another instance of said first query object and also without overwriting said modified transaction data in said first EO instance.

11. The digital processing system of claim 10, wherein said first set of parameters are maintained in said first query instance and wherein said retrieve retrieves said first set of parameters from said first query instance.

12. The digital processing system of claim 11, wherein said data store comprises a relational database, wherein each row of a first table in said relational database is retrieved into a corresponding instance of the first EO upon execution of said first query specified in said first query object,
wherein said first transaction data retrieved into said first EO instance and said second EO instance comprises data stored in a first row of said first table in said relational database.

13. The digital processing system of claim 12, wherein said first query is according to structured query language (SQL).

14. The digital processing system of claim 10, wherein said application comprises a code module which generates an indication that said another copy is to be retrieved from said data store and said actions are performed in response to said indication.

15. The digital processing system of claim 14, wherein each of said modified transaction data in said first EO instance and said another copy in said second EO instance comprise a same set of attributes, wherein each attribute has an associated value, said code module is designed to perform the further actions of:

retrieve a first set of values corresponding to said same set of attributes in said modified transaction data and a second set of values corresponding to said same set of attributes in said another copy of said first transaction data;

compare said first set of values with the respective ones of said second set of values; and     generate a result of comparison for each of said same set of attributes.

16. The digital processing system of claim 15, wherein said result corresponding to a first attribute indicates an old value and a modified value,     wherein said old value is contained in said first set of values and said modified value is contained in said second set of values associated with said first attribute,     wherein said first attribute is contained in said same set of attributes.

17. The digital processing system of claim 10, wherein said application is developed using said ADF.

18. The digital processing system of claim 17, wherein said application comprises a view layer, a controller layer, a model layer and a business service layer.

* * * * *

UNITED STATES PATENT AND TRADEMARK OFFICE
CERTIFICATE OF CORRECTION

| | | |
|---|---|---|
| PATENT NO. | : 8,069,172 B2 | Page 1 of 1 |
| APPLICATION NO. | : 12/264910 | |
| DATED | : November 29, 2011 | |
| INVENTOR(S) | : Bhattiprolu et al. | |

It is certified that error appears in the above-identified patent and that said Letters Patent is hereby corrected as shown below:

In column 12, line 65, delete "retrived" and insert -- retrieved --, therefor.

In column 13, line 27, delete "transcation" and insert -- transaction --, therefor.

In column 13, line 38, delete "Accordinlgy," and insert -- Accordingly, --, therefor.

In column 13, line 40-41, delete "transcation" and insert -- transaction --, therefor.

In column 13, line 46, delete "determinde" and insert -- determined --, therefor.

In column 15, line 34, delete "moduleiblock" and insert -- module/block --, therefor.

In column 16, line 15, delete "way" and insert -- way. --, therefor.

Signed and Sealed this
Thirteenth Day of March, 2012

David J. Kappos
*Director of the United States Patent and Trademark Office*